Patented July 3, 1934

1,964,792

UNITED STATES PATENT OFFICE 1,964,792

PROCESS OF PURIFYING CRUDE AROMATIC NITROCOMPOUNDS

Clark Warren Davis, Birmingham, Ala., assignor to E. I. du Pont de Nemours & Company, Wilmington, Del., a corporation of Delaware No Drawing. Application July 17, 1931, Serial No. 551,559

10 Claims. (Cl. 260—142)

My invention relates to a process for the purification of crude trinitrotoluene and other crude aromatic nitrocompounds, and more specifically to a method for the removal of the various isomers formed during the nitration.

Trinitrotoluene as produced by the usual methods consists of a mixture of various isomeric compounds of the same empirical formula. The 2, 4, 6, modification is the principal compound formed. However, smaller amounts of the other two isomers, the 2, 3, 4 and the 2, 4, 5 modifications are present also. The crude trinitrotoluene first formed may have a freezing point varying from 73 to 80° C., depending on the method of production and on the preliminary purification. For most conditions of use, specifications call for a freezing point for trinitrotoluene of at least 80° C. Any lower freezing point than this indicates the presence of an undesirably large amount of impurities.

Various methods have been proposed for the purification and refining of crude trinitrotoluene. Methods based on fractional crystallization from various organic solvents give a satisfactory product, but the use of such methods is not desirable because of the losses of solvent and product that result. Because of the fact that the impurities present in the trinitrotoluene are mostly on the surface, a washing process seems more suitable, since by such a process a minimum of solvent comes in contact with a maximum of impurities.

Washing processes for the purification of aromatic nitrocompounds have been used heretofore. For example, one well known process of this type makes use of carbon tetrachloride, either alone or mixed with benzene, for the refining of trinitrotoluene.

However, the use of carbon tetrachloride for this purpose is undesirable in some respects. One reason for this lies in the fact that the solvent must be removed from the extracting solution, which is usually brought about, in the case of carbon tetrachloride, by means of steam distillation. Under such conditions, carbon tetrachloride has a relatively considerable corrosive action on iron apparatus.

I have discovered that a desirable washing solution for the aromatic nitrocompound is obtained by use of a solvent comprising two miscible liquids, in one of which the nitrocompound is soluble and in the other insoluble. For the liquid in which the nitrocompound is insoluble, water is most generally desirable because of its availability and lack of offensive properties.

An object of my invention is to provide a new and improved process for refining crude trinitrotoluene which gives a product of high purity. A further object is a process which has none of the disadvantages of methods heretofore in use. Other objects will appear hereinafter.

I have discovered that a satisfactory solvent for the purification of trinitrotoluene is provided by use of an aqueous solution of acetone. While various compositions of this aqueous solution may be used, I find that a solution containing 40 to 70 per cent of acetone to be satisfactory. Preferably, I use a 60 per cent solution of acetone in water. If a solvent is used containing more than 70 per cent of acetone, an undesirably large amount of trinitrotoluene goes into solution, with the result that low recoveries are obtained. If, on the other hand, a solvent is used containing less than 40 per cent of acetone, excessively large amounts of solvents are required, because of the fact that trinitrotoluene has a very low solubility in such a solution.

While the temperature at which the process is carried out may be varied over a considerable range, I have found that the lower the temperature, the more efficient the washing becomes. Also the amount of solvent solution may be varied over a wide range; it will be apparent from the foregoing that the greater the amount of solvent employed, the higher the quality of product obtained, but the greater the loss in yield of recovered product. I have found, however, that when maintaining a temperature below 30° C., a ratio of one part of solvent to one to three parts of trinitrotoluene treated, produces a product entirely satisfactory for general uses to which so-called refined trinitrotoluene is regularly put.

By way of describing a more specific embodiment of this invention the following example is given. Twenty-five pounds of the trinitrotoluene to be purified is treated in a suitable apparatus with 6 gallons of 60 per cent acetone at a temperature of 20° C., the solvent being added slowly and in such a way that it is continuously removed from the trinitrotoluene. After the aqueous solution of acetone has been passed through or over the material, the residual acetone is displaced by washing with 12 gallons of water. The trinitrotoluene thus purified, may be melted by the application of steam, separated from water and converted to the form of product desired, for example, by treatment in a suitable graining kettle. The solution used for extraction and the wash waters are accumulated. The dilution of the acetone solution by the wash water will be sufficient ordinarily for the precipitation of all the material originally extracted by the 60 per cent solution. This precipitated material is eventually recovered, as is also the acetone from the dilute solution.

Using the process described above, with two parts of solvent to one part of trinitrotoluene by weight, it was found that the freezing point of a crude trinitrotoluene was raised from 77.4° C. to 80.4° C., using a temperature of 20° and a 60 per cent acetone solution.

While I have illustrated the process as applied to the purification of trinitrotoluene, this process is also similarly applicable to the refining of many other aromatic nitrocompounds, such, for example, as trinitro-benzene, trinitro-xylene, trinitro-naphthalene, and tetranitro-aniline.

It will be understood also, that, while I have described my new process in considerable detail, many variations may be made in the details of the process without departing from the spirit of my invention, and that I do not intend to be limited except as indicated in the following patent claims:

I claim:

1. The process of purifying solid, aromatic nitrocompounds which comprises washing the surface of the crystals of said compounds with an aqueous solution of acetone.

2. The process of purifying solid, aromatic nitrocompounds which comprises washing the surface of the crystals of said compounds with an aqueous solution containing 40 to 70 per cent acetone.

3. The process of purifying solid, aromatic nitrocompounds which comprises washing the surface of the crystals of said compounds with an aqueous solution containing 40 to 70 per cent acetone, separating the purified nitrocompound from the solution, diluting the extracting medium with water until the complete precipitation of the dissolved material, and separately recovering the said dissolved material and the acetone.

4. The process of purifying trinitrotoluene which comprises washing the surface of the crystals of said compound with an aqueous solution of acetone.

5. The process of purifying trinitrotoluene which comprises washing the surface of the crystals of said compound with an aqueous solution containing 40 to 70 per cent of acetone.

6. The process of purifying trinitrotoluene which comprises washing the surface of the crystals of said compounds with an aqueous solution containing 40 to 70 per cent acetone, separating the purified nitro-compound from the solution, diluting the extracting medium with water until the complete precipitation of the dissolved material, and separately recovering the said dissolved material and the acetone.

7. The process of purifying trinitrotoluene which comprises washing the surface of the crystals of said compound with an aqueous solution of acetone, the washing solution being at a temperature not exceeding 30° C.

8. The process of purifying trinitrotoluene which comprises washing the surface of the crystals of said compound with an aqueous solution of acetone, the washing solution being at a temperature of 10 to 30° C.

9. The process of purifying trinitrotoluene which comprises washing the surface of the crystals of said compound with an aqueous solution containing 40 to 70 per cent of acetone, the washing solution being at a temperature not exceeding 30° C., separating the purified nitrocompound from the solution, diluting the extracting medium with water until the complete precipitation of the dissolved material, and separately recovering the said dissolved material and the acetone.

10. The process of purifying trinitrotoluene which comprises washing the surface of the crystals of said compound with an aqueous solution containing 40 to 70 per cent of acetone, a ratio of one part of solvent by weight being used for one to three parts of trinitrotoluene treated.

CLARK WARREN DAVIS.